(12) United States Patent
McAlister (10) Patent No.: US 9,279,526 B2
(45) Date of Patent: Mar. 8, 2016

(54) APPARATUSES AND METHODS FOR PROVIDING FINGER-TIGHTENED AND RATCHET-SECURED CONNECTIONS BETWEEN CONDUITS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/826,773

(22) Filed: Mar. 14, 2013

(65) Prior Publication Data

US 2014/0265312 A1 Sep. 18, 2014

(51) Int. Cl.
*F16L 37/12* (2006.01)
*F16L 19/00* (2006.01)
*F16L 19/02* (2006.01)

(52) U.S. Cl.
CPC ........... *F16L 19/005* (2013.01); *F16L 19/0231* (2013.01)

(58) Field of Classification Search
CPC ..................................................... F16L 19/005
USPC .................. 285/92, 308, 314, 86, 85, 925
See application file for complete search history.

(56) References Cited

U.S. PATENT DOCUMENTS

| | | | | |
|---|---|---|---|---|
| 643,358 A * | 2/1900 | Konold | ............................ | 285/85 |
| 3,915,460 A * | 10/1975 | Kramer | ......................... | 285/925 |
| 4,156,540 A * | 5/1979 | Currie | ............................ | 285/925 |
| 4,443,019 A * | 4/1984 | Ishido et al. | ................... | 277/652 |
| 4,802,695 A * | 2/1989 | Weinhold | ........................ | 285/91 |
| 5,096,206 A * | 3/1992 | Andre et al. | .................. | 285/925 |
| 5,127,679 A * | 7/1992 | Pouplier | ......................... | 285/92 |
| 5,188,398 A * | 2/1993 | Parimore et al. | ................ | 285/92 |
| 5,215,336 A * | 6/1993 | Worthing | ........................ | 285/92 |
| 5,348,349 A * | 9/1994 | Sloane | ............................ | 285/92 |
| 5,586,791 A * | 12/1996 | Kirchner et al. | .............. | 285/330 |
| 5,649,797 A * | 7/1997 | Warren et al. | ................... | 285/92 |
| 5,746,454 A * | 5/1998 | Webb | .............................. | 285/92 |
| 5,882,044 A * | 3/1999 | Sloane | ............................ | 285/92 |
| 5,931,508 A * | 8/1999 | Spriegel | .......................... | 285/92 |
| 6,056,326 A * | 5/2000 | Guest | .............................. | 285/93 |
| 6,302,447 B1 * | 10/2001 | Lee | ................................. | 285/86 |
| 6,334,632 B1 * | 1/2002 | Nishio et al. | .................... | 285/92 |
| 6,443,496 B2 * | 9/2002 | Campau | ......................... | 285/86 |
| 6,692,036 B2 * | 2/2004 | Nguyen et al. | .................. | 285/92 |
| 6,857,665 B2 * | 2/2005 | Vyse et al. | ...................... | 285/92 |
| 6,905,142 B2 * | 6/2005 | Do et al. | ......................... | 285/92 |
| 7,156,424 B2 * | 1/2007 | McCord | ........................... | 285/92 |

(Continued)

*Primary Examiner* — David E Bochna
(74) *Attorney, Agent, or Firm* — Perkins Coie LLP (57) ABSTRACT

An apparatus for providing a connection to a conduit may include a first part configured to be threadably attached to a second part. The first part can include a male threaded section spaced axially apart from a ratchet section having radially protruding teeth. The second part can be at least partly formed by an elastically deformable material and includes a female threaded section spaced axially apart from at least one pawl that is configured to engage the radially protruding teeth. When the at least one pawl is engaged with the teeth, relative rotation between the first part and the second part may be allowed in a tightening direction and prevented in a loosening direction or may be allowed in the tightening and loosening directions. When the second part is deformed by at least one radially inward force, the at least one pawl disengages the teeth of the ratchet section.

20 Claims, 5 Drawing Sheets

(56) References Cited

U.S. PATENT DOCUMENTS

| | | | |
|---|---|---|---|
| 7,469,933 B2 * | 12/2008 | Swift et al. | 285/86 |
| 7,571,937 B2 * | 8/2009 | Patel | 285/92 |
| 7,770,938 B2 * | 8/2010 | Bauer | 285/308 |
| 7,984,931 B2 * | 7/2011 | Kertesz et al. | 285/308 |
| 8,240,715 B2 * | 8/2012 | Itou et al. | 285/92 |

* cited by examiner

FIG. 1A

FIG. 1B
(Section I-I)

FIG. 1C
(Section II-II)

FIG. 2B
(Section III-III)

FIG. 2C
(Section IV-IV)

FIG. 5A
(Section V-V)

FIG. 5B
(Section V'-V')

FIG. 6

APPARATUSES AND METHODS FOR PROVIDING FINGER-TIGHTENED AND RATCHET-SECURED CONNECTIONS BETWEEN CONDUITS

CROSS-REFERENCE TO RELATED APPLICATION(S)

The present application incorporates the following U.S. patent applications by reference in their entireties: U.S. patent application Ser. No. 13/826,331, now U.S. Pat. No. 9,091,373, entitled "APPARATUSES AND METHODS FOR PROVIDING QUICK-CONNECTIONS WITH RETAINING FEATURES," filed Mar. 14, 2013, and U.S. patent application Ser. No. 13/831,344, entitled "DYNAMIC SENSORS," filed on Mar. 14, 2013.

TECHNICAL FIELD

The following disclosure relates generally to fittings and couplings for fluid conveying conduits. More particularly, the present disclosure is directed to apparatuses and methods for providing quick-connections for fluid conveying conduits.

BACKGROUND

Fittings are frequently used to connect two objects, such as, two or more tubes or a tube and a device that facilitates fluid communication with a tube. For example, a fitting can connect a valve to a tube such that the valve can regulate the flow of fluid through the tube. Fittings may also be utilized to cap or plug an end of a tube. To prevent a fluid from leaking, however, a fitting must maintain a seal with the tube while withstanding various environmental factors, including, for example, pressure, temperature, vibration, etc.

It may be advantageous in various applications to provide a connection between two tubes, such as a fitting, that can be a hand or a finger-tight connection. A finger-tight connection is so called because a user can tighten and loosen the connection without the use of separate tools. For example, a finger-tight connection fitting may be desirable for connecting tubes in hard to reach places that cannot be readily accessed by a wrench or other tightening tools. In another example, a finger-tight connection may provide a speedy connection when time is a concern, such as in healthcare, emergency services, and automotive applications. A finger-tight connection is so called because it may be manually tightened and loosened with relative ease.

One problem associated with conventional finger-tight connection fittings, however, is that they may be susceptible to leakage. For example, leakage may occur as a result of degradation of a gasket or an o-ring forming a seal in the fitting. Leakage may also result from mechanical loosening of the fitting caused by thermal cycling, vibration, or other environmental factors. Leakage in a fluid conveying system is undesirable for many reasons.

DETAILED DESCRIPTION

The present disclosure is directed generally to coupling or fitting assemblies including ratchet and corresponding pawl portions. An apparatus configured in accordance with one aspect of the disclosure includes a first part and a second part configured to be threadably joined to the first part by relative rotation about a central longitudinal axis. The first part includes a male threaded section axially spaced from a first engaging section, such as a ratchet section, having radially protruding teeth. The male threaded section and the ratchet section are axially aligned with the central longitudinal axis. The second part may be at least partly formed by an elastically deformable material and includes a female threaded section corresponding to the male threaded section. The second part also includes a second engaging section, such as a pawl section with one or more pawls axially spaced apart from the female threaded section. The pawl section is configured to engage or otherwise fit between the radially protruding teeth of the ratchet section of the first part.

According to further aspects of the disclosure, the second part may be configured such that, when the second part is relaxed, the pawl section engages the ratchet section, and when the second part is deformed by at least one radially inward force, the pawl section disengages the ratchet section. When the pawl section engages the ratchet section, relative rotation between the first part and the second part may be allowed in a tightening direction and prevented in a loosening direction. When the pawl section disengages the ratchet section, relative rotation between the first part and the second part may be allowed in both the tightening and loosening directions.

Embodiments of the present disclosure provide relatively easy and quick connections for fitting or coupling assemblies and conduits, including, for example, finger-tightened and ratchet-secured connections. In certain embodiments, a male connector and a female connector may be threadably joined to form a fitting assembly for attachment to a conduit (e.g., a tube, pipe, etc.). The fitting assembly can include engagement sections, including, for example, corresponding ratcheting features carried by each of the male and female connectors to allow the male and female connectors to be securely fastened together, and also at least partially prevent the connectors from unintentionally loosening or separating. When the connectors are to be loosened, the ratchet feature can be disengaged by depressing opposing sides of the female connector, as described in detail below. As such, a user can hold, squeeze, and turn the female connector to release the connection. As used herein, the term "conduit" refers to any type of tube or pipe that is suitable for conveying any type of fluid (e.g., liquids, gases, etc.).

Figure 1A:
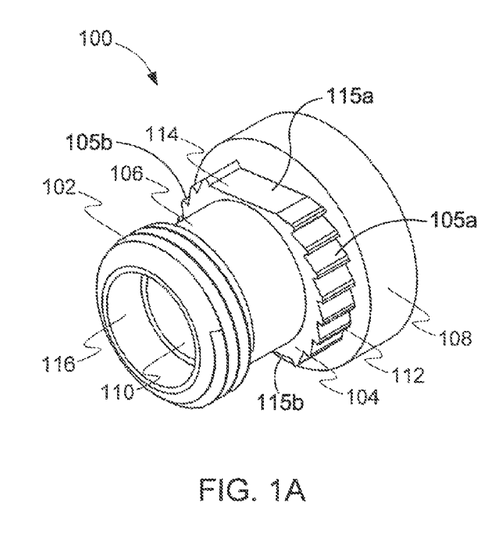
FIG. 1A is an isometric view of a male connector configured in accordance with an embodiment of the disclosure.
Figure 1B:
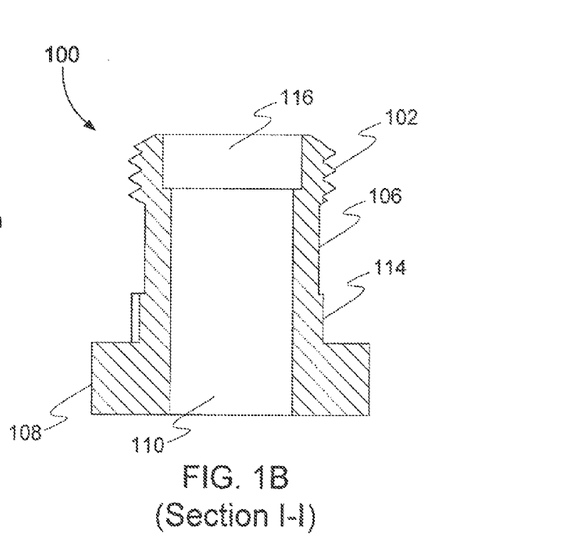
FIG. 1B is a side cross-sectional view of the male connector taken substantially along the line I-I of FIG. 1D.
Figure 1C:
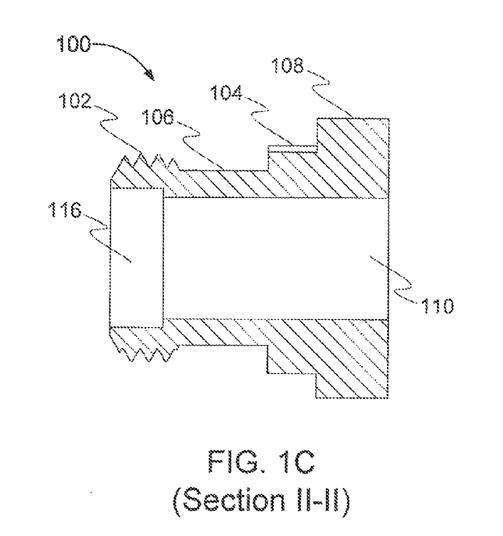
FIG. 1C is a side cross-sectional view of the male connector taken substantially along the line II-II of FIG. 1D.
Figure 1D:
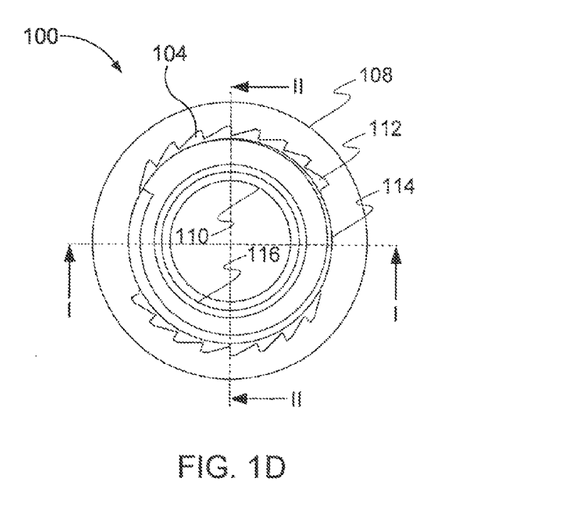
FIG. 1D is a top of the male connector of FIG. 1A.

FIG. 1A is an isometric view of a male connector 100 configured in accordance with an embodiment of the disclosure. The male connector 100 is one of many components included in the fitting assemblies described in detail herein. FIG. 1D is a top view of the male connector 100 of FIG. 1A, FIG. 1B is a side cross-sectional view of the male connector 100 taken substantially along the line I-I of FIG. 1D, and FIG. 1C is a side cross-sectional view of the male connector 100 taken substantially along the line II-II of FIG. 1D. Referring to FIGS. 1A-1D together, the male connector 100 may be formed from a variety of materials suitable for use with fluid conveying conduits including, for example, various metals, plastics, combinations of metals and plastics, etc. In the illustrated embodiment, the male connector 100 includes a base section 108, a first retaining section 104 adjacent to the base section 108, and a threaded section 102 spaced apart from the first retaining section 104 by a spacer section 106. The male connector 100 also includes an internal bore section 110 extending through the male connector 100, and a counter bore section 116 in the internal bore section 110 in the region of the threaded section 102.

In the illustrated embodiment, the threaded section 102 is axially aligned with a central longitudinal axis, such as an axis defined by the male connector internal bore 110. The threaded section 102 facilitates threadably coupling or joining the male connector 100 with other components or parts having corresponding matching female threads. In certain embodiments, the threaded section 102 may have right-handed threads or left-handed threads. In general, if the threaded section 102 has a right-handed thread pattern, clockwise rotation of the male connector 100 will be a tightening direction, and counterclockwise rotation will be a loosening direction. Moreover, in certain embodiments the threaded section 102 may have a surface coating (e.g., dry lube, nylon, Teflon®, halogenated polymer, conditionally activated adhesive, grease, etc.) to lubricate, lock, seal, and/or conditionally lock the threaded section 102 with corresponding mating threads. In addition, as will be appreciated of one of ordinary skill in the relevant art, the threaded section 102 may have various geometries or threaded patterns, such as those defined by the Unified Thread Standard.

The first retaining section 104 is also coaxially aligned with the central longitudinal axis. As shown in the illustrated embodiment, the first retaining section 104 is a ratcheting section or portion of the male connector 100, and is configured to operably engage a corresponding ratcheting section of a female connector of the assembly (described in detail below). More specifically, the first retaining 104 includes a first ratcheting section 105a opposite a second ratcheting section 105b (FIG. 1A). Each of the ratcheting sections 105 includes a plurality of teeth 112 that are radially protruding from the male connector 100. The teeth 112 may be configured to engage one or more pawls of a corresponding ratcheting section to provide one-way relative rotation of the male connector 100 during threadable coupling, as described in detail below. According to another feature of the illustrated male connector 100, the first retaining section 104 also includes one or more clearance regions 114. More specifically, the clearance regions 114 include generally planar sections positioned between the ratcheting sections 105 of the first engagement section 104. The first retaining section 104 and corresponding elements thereof are discussed in further detail below with reference to FIGS. 3-5.

Another feature of the male connector 100 illustrated in FIGS. 1A-1D is that the spacer section 106 may be tailored for specific applications. As shown in FIGS. 1A-1C, for example, the spacer section 106 provides axial separation between the threaded section 102 and the first retaining section 104. In other embodiments, however, the spacer section 106 can be omitted such that the threaded section 102 is adjacent to the first retaining section 104.

The base section 108 is also configured to accommodate various structures when the male connector 100 is attached to a conduit. In one embodiment, for example, the male connector 100 may be attached to a conduit by the joining (e.g., welding fitting crimping etc.) the base section 108 to an end portion of a conduit. In another embodiment, the base section 108 may have internal or external threads to facilitate attachment to a compatibly threaded conduit or other component. In yet another embodiment, the base section 108 may include a gripping surface for fingers. For example, the exterior surface of the base section 108 may have a knurled or otherwise textured finish. In accordance with a further embodiment, the base section 108 may be configured to be compatible with certain tightening tools. For example, the base section 108 may have a hexagonal cross-sectional shape to accommodate turning by a wrench, or a wall thickness suitable for crimping.

The internal bore 110 of the male connector 100 is configured to facilitate fluid communication through the male connector 100. For example, the internal bore 110 may be configured to receive a conduit to form a substantially continuous hollow channel for conveying a fluid (e.g., a liquid, gas, etc.). Moreover, the counterbore 116 is configured to accommodate various adapters, seal compounds, or other accessories as discussed below in detail with reference to FIGS. 3 and 4. In certain embodiments, however, the internal bore 110 and/or the counterbore 116 may be omitted from the male connector 100 so that the male connector 100 may serve as a plug when the male connector 100 is attached to a conduit.

Figures 2A, 2B:
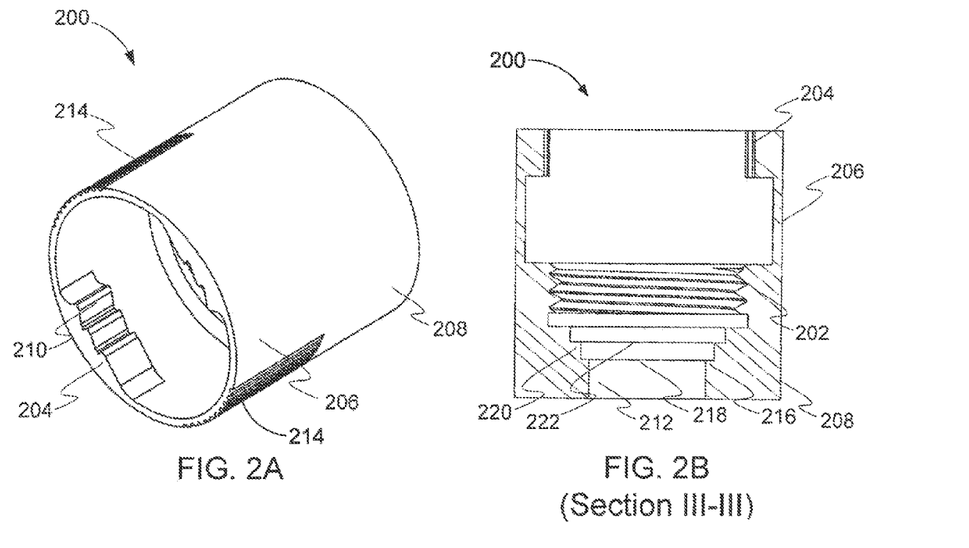
FIG. 2A is an isometric view of a female connector configured in accordance with an embodiment of the disclosure.
FIG. 2B is a side cross-sectional view taken substantially along the line III-III of FIG. 2D.
Figure 2C:
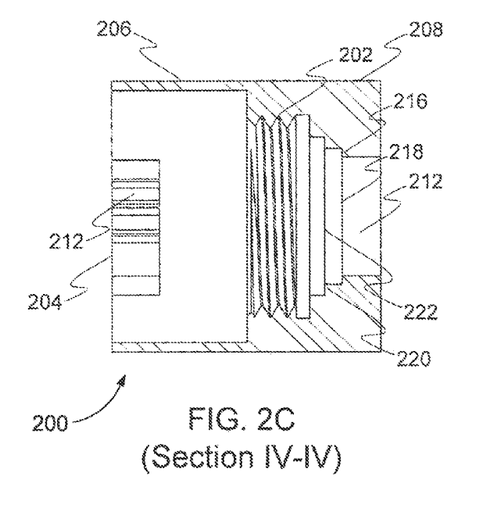
FIG. 2C is a side cross-sectional view taken substantially along the line IV-IV of FIG. 2D.
Figure 2D:
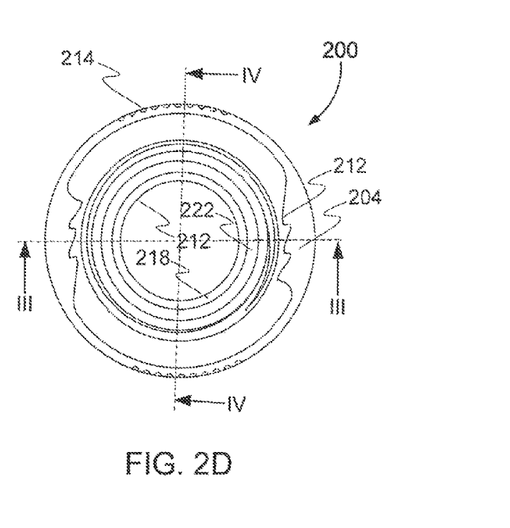
FIG. 2D is a top view of the female connector of FIG. 2A.

FIG. 2A is an isometric view and FIG. 2D is a top view of a female connector 200 configured in accordance with an embodiment of the disclosure. FIG. 2B is a side cross-sectional view taken substantially along the line III-III of FIG. 2D, and FIG. 2C is a side cross-sectional view taken substantially along the line IV-IV of FIG. 2D. Referring to FIGS. 2A-2D together, the female connector 200 is configured to be removably connected o the male connector 100 discussed above with reference to FIGS. 1A-1D. The female connector 200 may be fabricated from a variety of materials suitable for use with fluid conveying conduits including, for example, various metals, plastics, combinations of metals and plastics, etc. In the illustrated embodiment, the female connector 200 includes a base section 208 and a skirt section 206 extending from the base section 208. The female connector 200 also includes an internal threaded section 202 in the base section 208, and a second retaining section 204 carried by the skirt section 206. The female connector 200 also includes textured regions 214 opposite each other at an exterior surface of the skirt section 206.

In the illustrated embodiment, the threaded section 202 is axially aligned with a central longitudinal axis of the female connector 200, and configured to mate with the threaded section 102 of the male connector 100 described above. Similar to the threaded section 102 of the male connector 100, the threaded section 202 of the illustrated female connector 200 may have right-handed or left-handed threads, depending on whether the threaded section 102 of the male connector 100 has right-handed or left-handed threads. In certain embodiments, the thread patterns of these mating parts can be configured for different applications. For example, assemblies or connectors associated with fuel connections may have left-handed threads to avoid inadvertent mixing of fuels, while assemblies are connectors associated with oxidant connections may comprise right-handed threads to avoid inadvertent mixing of oxidants. Moreover, the threaded section 202 of the female connector 200 may have a surface coating (e.g., dry lube, nylon, halogenated polymer, Teflon®, conditionally activated adhesive, grease, etc.) to lubricate, lock, seal, or conditionally lock the threaded section 202 of the female connector 200 with the threaded section 102 of the male connector 100.

According to another feature of the illustrated embodiment, second retaining section 204 is configured to engage the first retaining section 104 of the male connector 100 (see, e.g., FIGS. 1A-1D). More specifically, the illustrated second retaining section 204 is a ratcheting section including one or more pawls 210 that are configured to engage and fit between the teeth 112 of the first retaining section 104 of the male connector 100. In certain embodiments, each of the pawls 210 may be hinged at the second retaining section 204 (e.g., with a hinge bearing, living hinge, etc.). The pawls 210 are configured to engage the corresponding teeth 112 of the first retaining section 104 to provide one-way relative rotation between the male connector 100 and the female connector 200. During rotation in a tightening direction, for example, the pawls 210 may slide up and over the teeth 112. The skirt section 206 provides a restoring force that forces the pawls 210 into the spaces between the teeth 112. In this manner, the pawls 210 catch or engage adjacent teeth 112 thereby impeding rotation of the female connector 200 relative to the male connector 100 in a loosening direction opposite the tightening direction. Certain features of the engagement and disengagement between the pawls 210 and the teeth 112 are described below in greater detail with reference to FIG. 5.

Figure 5A:
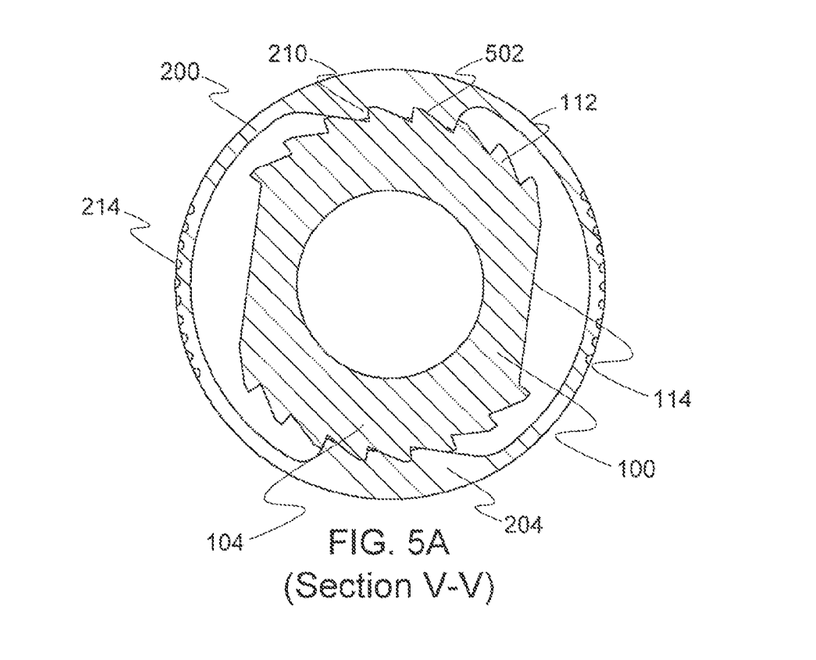
FIG. 5A is a side cross-sectional view taken substantially along the line V-V of FIG. 4A.
Figure 5B:
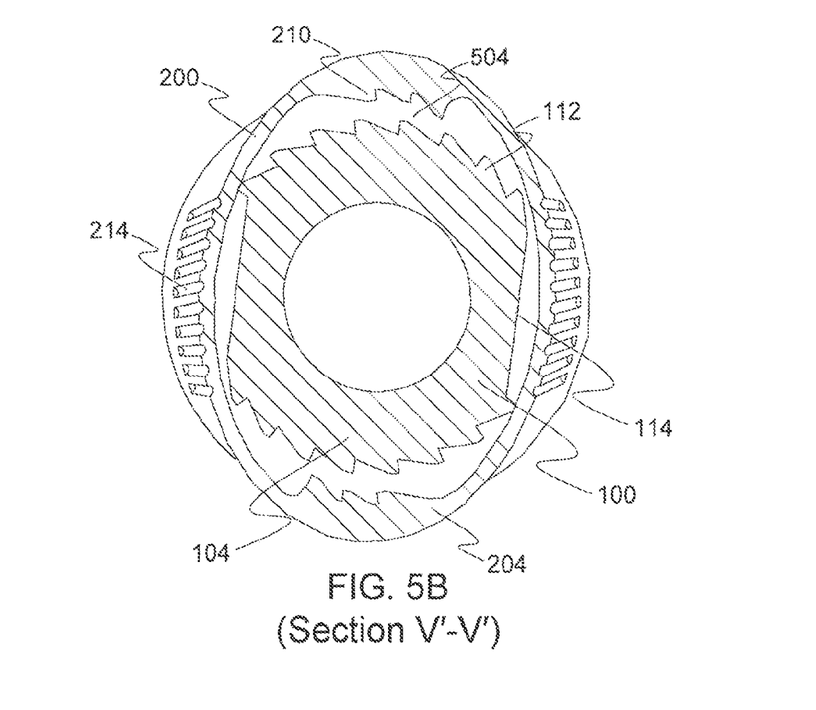
FIG. 5B is a side cross-sectional view taken substantially along the line V-V of FIG. 4A with the second connector at last partially deformed.

As shown in the illustrated embodiment, the skirt section 206 extends away from the base section 208 of the female connector 200. In certain embodiments, the skirt section 206 is made of a flexible and substantially elastic or deformable material so that when it is deformed, for example, by a radially inward force, the skirt section 206 returns to its original shape. In one embodiment, for example, the skirt section 206 is made from a generally flexible material while the threaded section 202 is made from a more rigid and/or durable material. In such an embodiment, the skirt section 206 may be plastic and the threaded section 202 may be a metal or metal alloy. In addition, the textured regions 214 of the skirt section 206 can serve as grip enhancement areas of the skirt section 206. The textured regions 214 can also indicate a location on the external surface of the skirt section 206 relative to the second retaining section 204 of an area to apply a radially inward force (e.g., by squeezing) or otherwise deform the skirt section 206, as discussed in greater detail below with reference to FIG. 5.

The internal bore 212 of the female connector 200 is configured to facilitate fluid communication through the female connector 200. For example, the internal bore 212 may be configured to receive a tube such that the tube and the internal bore 212 form a substantially continuous hollow channel for conveying a fluid (e.g., a liquid, gas, etc.). In other embodiments, however, the female connector internal bore 212 may be omitted so that the female connector 200 may serve as a cap or plug attached to the tube. As shown in the illustrated embodiment, the female connector 200 also includes a first circumferential shoulder 216 and a second circumferential shoulder 220. The first circumferential shoulder 216 forms a retaining surface 218, and the second circumferential shoulder 220 forms a stop surface 222. In certain embodiments, one or more of the first circumferential shoulder 216 and the second circumferential shoulder 220 can include a right-circular or chamfered shoulder. The first circumferential shoulder 216 and the second circumferential shoulder 220, as well as the retaining surface 218 and the stop surface 222, are discussed in greater detail below with reference to FIGS. 4A and 4B.

Figure 3:
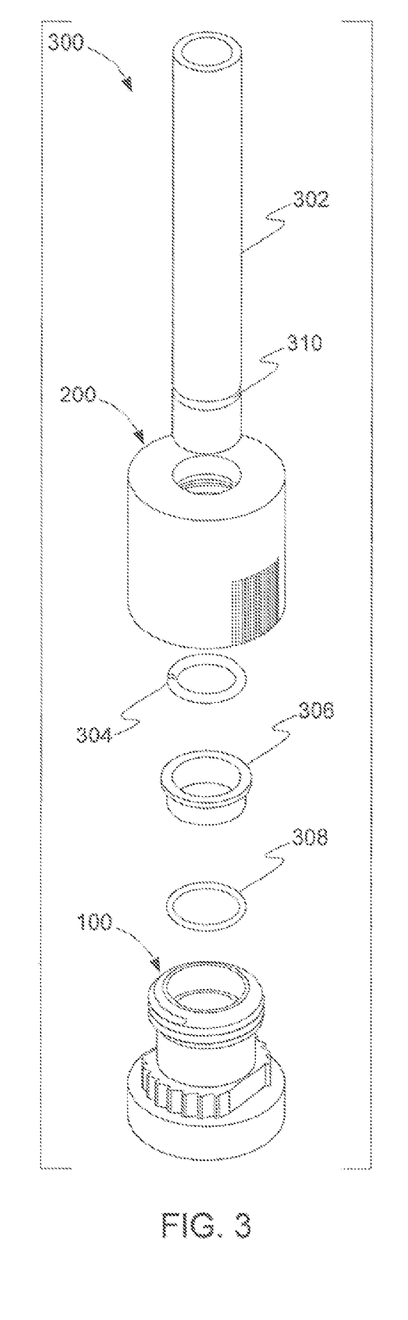
FIG. 3 is an exploded view of a fitting assembly configured in accordance with an embodiment of the disclosure.
Figure 4A:
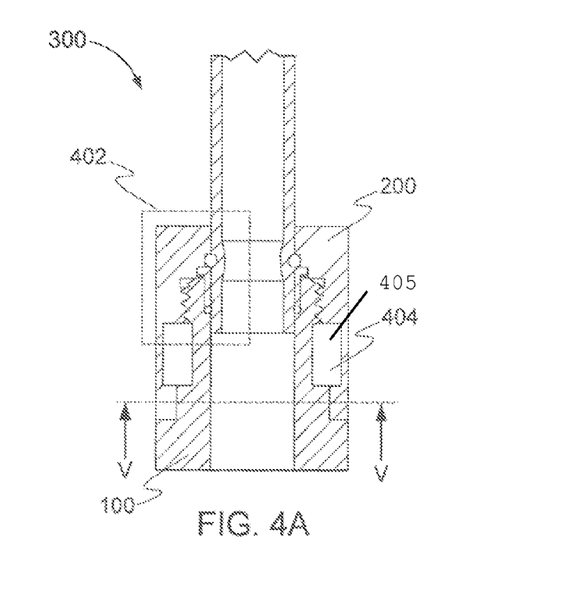
FIG. 4A is an enlarged side cross-sectional view of a portion of the fitting assembly of FIG. 3.

Referring next to FIG. 3, FIG. 3 is an exploded view of a fitting assembly 300 configured in accordance with an embodiment of the disclosure. As shown in the illustrated embodiment, the assembly 300 includes a conduit 302, the female connector 200, a spring lock 304, a seal adapter 306, an O-ring 308, and the male connector 100. According to one aspect of the illustrated embodiment, the order of the female connector 200 and the male connector 100 can be changed so that the male connector 100 is between the tube 302 and the spring lock 304, and the female connector 200 is directly adjacent to the O-ring 308. In such a case, the male connector 100 may further include the circumferential shoulders 216 and 220, as well as the retaining surface 218 and the stop surface 222 described above with reference to the female connector 200.

The conduit 302 provides fluid transport such that a liquid, gas, or any other type of fluid may be conveyed from one location to another. Although the illustrated conduit 302 has a generally cylindrical shape, in other embodiments the conduit 302 may include a tee, cross, elbow, or other shape suitable for conveying fluids. The outer-diameter of the conduit 302 may be slightly smaller than the diameter of the female connector internal bore 212 and/or the male connector internal bore 110. Moreover, the conduit 302 may be formed of one or more of various suitable materials for transferring fluids, including, for example, ceramics, glass, metals, plastics, and/or combinations thereof.

In certain embodiments, the conduit 302 includes an annular groove 310 near an end portion of the conduit 302. The annular groove 310 provides a location to secure the spring lock 304. For example, the annular groove 310 may have a depth of approximately half the cross-sectional diameter of the spring lock 304. The spring lock 304 may be seated in the annular groove 310 by stretching the spring lock 304 over the end of the conduit 302 and sliding the spring lock 304 into the annular groove 310. With the spring lock 304 seated in the annular groove 310, the spring lock 304 provides a fixed, circumferential protrusion near the end portion of the tube 302. Alternatively, the tube 302 may be cold-formed or hot-formed to produce a circumferential protrusion at the located of the annular groove. The circumferential protrusion can be used to retain the conduit 302 within the female connector 200 and/or the male connector 100. In alternate embodiments, the conduit 302 may comprise a flange at the end portion, rather than the annular groove 310, to provide a generally similar circumferential protrusion. Moreover, the flange may be attached to the end portion of the conduit 302, for example, by welding, fusing, brazing, gluing, molding, swaging, etc.

To assemble the components of the assembly 300, the conduit 302 may be inserted into the female connector internal bore 212. Subsequently, the spring lock 304 may be affixed to the conduit 302 at the annular groove 310. As such, the spring lock 304 will prevent the female connector 200 from sliding off of the end portion of the conduit 302. Next, the seal adapter 306 may be slid over the end portion of the conduit 302, flanged-end first. In certain embodiments, the seal adapter 306 may be formed from a substantially rigid material, such as a metal, plastic, elastomeric, or other suitable material. Following the seal adapter 306, a seal, such as the O-ring 308, may be placed on the conduit 302. In one embodiment, the seal adapter 306 and the O-ring 308 may be combined into a single element or component. The O-ring 308 may be formed from an elastomeric material, relatively soft metals, or any other suitable rubber or thermoplastic material providing desired sealing characteristics. Finally, the male connector 100 may be threadably joined to the female connector 200 by relative rotation therebetween.

As noted above, the male connector 100 and the female connector 200 are configured to be easily and quickly coupled or joined together for attachment to the conduit 300. For example, a user can axially align the male connector 100 and the female connector 200 on the conduit 302 and rotate the female connector 200 in a tightening direction relative to the male connector 100. When rotated in the tightening direction, the second retaining section 204 of the female connector 200, including the pawls 210, engages the corresponding first retaining section 104 of the male connector 100 to maintain the connection between these fittings and prevent the female connector 200 from loosening or rotating in a loosening direction that is opposite the tightening direction.

Figure 4B:
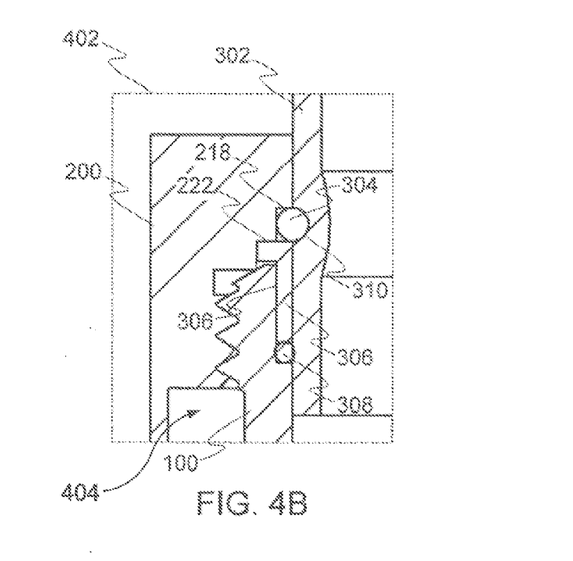
FIG. 4B is a detail view of a region of the fitting assembly of FIG. 4A.

FIG. 4A is an enlarged side cross-sectional view of a portion of the assembled assembly 300 of FIG. 3, and FIG. 4B is a detail view of a region 402 of the fitting assembly 300 of FIG. 4A. Referring to FIGS. 4A and 4B together, in the illustrated embodiment, the retaining surface 218 abuts the spring lock 304 (or other circumferential protrusion) so as to retain the conduit 302 within the female connector 200. A flanged end of the seal adapter 306 abuts, or nearly abuts, the opposite side of the spring lock 304 and the stop surface 222. The end opposite the flanged end of the seal adapter 306 fits within the counterbore 116 of the male connector 100. The O-ring 308 may be compressed by one or more of the seal adaptor 306, the conduit 302, and the male connector 100, thereby making a seal (e.g., a hermetic seal) around the conduit 302.

In certain embodiments, the seal adapter 306 and the O-ring 308 may be axially spaced apart from one another without leakage from the assembly 300. As such, the components of the assembly 300 (e.g., the conduit 302, the male connector 100, the seal adapter 306, the O-ring 308, the female connector 200, etc.) can accommodate significant axial displacement caused, for example, by thermal expansion and contraction, subjection to high G-forces, momentary disengagement of the teeth 112 of the male connector 100 and the pawls 210 of the female connector, etc. As such, the illustrated embodiment can accommodate extremely harsh conditions that would most likely cause the connection at conventional fitting assemblies to fail. Moreover, according to further embodiments, an easily distinguished indicator such as marking, coloring, or phosphorescent coating may be provided to enable inspection with at least one of an illuminating light source and an activating light source that detects the longitudinal movement or position of components of the assembly 300. Such an indicator can provide for easy inspection for preventative maintenance to maintain the system integrity.

According to another aspect of the illustrated embodiment, the assembly 300 includes at least one void 404 between the male connector 100 and the female connector 200 (see, e.g., FIG. 4A). In certain embodiments, the void 404 may be filled with a material 405 to prevent particulate or other foreign material buildup in the connection between the male connector 100 and the female connector 200. Filling the void 404 can also dampen vibration to prevent loosening of the connection.

In certain embodiments, the void 404 can be filled with a material including any deformable plastic foam, heavy grease, or other material suitable for use with fitting assemblies. In one embodiment, for example, a substance capable of hardening can be used to fill the void 404. As the substance hardens, it can form a permanent, or semi-permanent, connection. Examples of hardening substances suitable for use with certain embodiments may include, for example, thermosetting plastics or thermosets that irreversibly cure to a stronger form. These materials may be cured with heat, a chemical reaction (e.g., two-part epoxy), irradiation, etc.

In other embodiments, the void 404 may be filled by a substance or material that provides a hardening activation once exposed to trace amounts of a fluid passing through the assembly 300. Such trace amounts of fluid can result from, for example, an incipient stage of a leak. The activation of the substance may result in formation of a foam, adhesive, or sealing substance that fills the void 404 to prevent further leakage. Additionally, some embodiments may further comprise one or more annular voids at various positions, which may contain these substances.

In one embodiment, a "tattletale" element can be included in the vicinity of the connection formed by the male connector 100 and the female connector 200. The tattletale element may comprise a detector or other indicator that a seal, such as that provided by the O-ring 308, has failed and leakage is beginning to occur. The leakage may be indicated, for example, by visual inspection of the connection, such as by a change in color of a component of the assembly 300 and or a fluid leaking from the assembly 300. In another embodiment, the leakage may be indicated in response to an interrogation signal sent by a detector device.

According to yet another feature of the embodiments of the assembly 300 and corresponding components described above, the assembly 300 allows relatively free rotary motion between connectors (e.g., the male connector 100 and the female connector 200) and tubing (e.g., the conduit 302). This rotary motion may relieve torsional stresses that would otherwise potentially be present in the assembly 300. Such a configuration will enhance the assembly's 300 accommodation of thermal cycling, vibration, and fatigue as compared to conventional metal seals for tube and valve fittings.

FIG. 5A is a side cross-sectional view taken substantially along the line section V-V of FIG. 4A. In the illustrated embodiment, the female connector 200 is shown in a relaxed or non-deformed position generally surrounding the male connector 100. In this position, the second retaining section 204 of the female connector 200 is engaged with the first retaining section 104 of the male connector 100. More specifically, the pawls 210 of the female connector 200 are engaged with the teeth 112 of the male connector 100 by fitting in the spaces between the teeth 112. In this position, the pawls 210 allow relative rotation between the male connector 100 and the female connector 200 in one direction, which is the tightening direction. As illustrated in FIG. 5A, for example, the female connector 200 can rotate in a counter-clockwise direction relative to the male connector 100. During the relative rotation between the female connector 200 and the male connector 100 in the tightening direction, the pawls 210 slide up and over the teeth 112. The skirt 206 carrying the pawls 210 is flexible to allow any deflection of the female connector 200 as the pawls 210 pass over the teeth 112 in the tightening direction. Moreover, as each pawl 210 passes over the teeth 112, a restoring force is provided by resiliency of the skirt 206 of the female connector 200 to maintain the engagement between the pawls 210 and the teeth 112.

According to another aspect of the illustrated embodiment, the engagement of the pawls 210 in the teeth 112 resists relative rotation between the male connector 100 and the female connector 200 in a direction opposite the tightening direction. For example, in the embodiment illustrated in FIG. 5A, the pawls 210 prevent rotation of the female connector 208 in a clockwise direction with reference to the male connector 100 because the pawls 210 catch the corresponding teeth 112. In other embodiments, the relative rotation between the male connector 100 and the female connector 200 can be allowed in the loosening direction and prevented in the tightening direction.

FIG. 5B is a side cross-sectional view taken substantially along the line V-V of FIG. 4A with the skirt section 214 at last partially deformed to allow rotation of the female connector 200 in a loosening direction with reference to the male connector 100. More specifically, as shown in FIG. 5B, the skirt 206 can be deformed, for example, by two opposing, radially inward forces applied to the skirt 206 at the textured regions 214 on the skirt 206 between the second retaining sections 204. This deformation causes the pawls 210 to be deflected radially outward, and consequently, away from the corresponding teeth 112 on the male connector 100. According to another feature of the illustrated embodiment, the clearance regions 114 of the male connector 100 allow the skirt 206 to be sufficiently deformed to disengage the pawls 210 from the teeth 112. While the pawls 210 are disengaged from the teeth 112, relative rotation between the male connector 100 and the female connector 200 may occur in both the tightening and loosening directions (e.g., in clockwise and counterclockwise directions).

Figure 6:
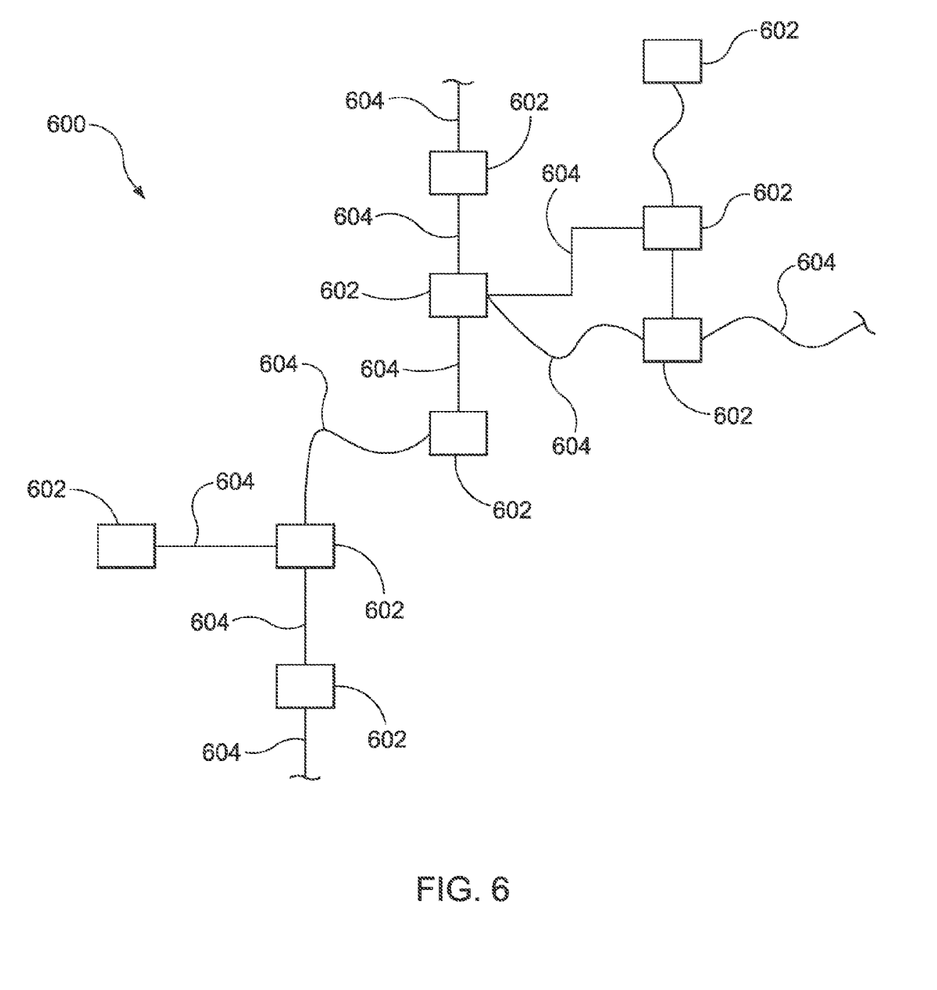
FIG. 6 is a schematic diagram of a fluid conduit system configured in accordance with an embodiment of the disclosure.

FIG. 6 is a schematic diagram of a fluid conduit system 600 configured in accordance with an embodiment of the disclosure. In the illustrated embodiment, the system 600 includes a plurality of fluid conveying conduits 604 that are joined to one another with corresponding fitting assemblies 602. The fitting assemblies 602 can also cap the end of a conduit 604. The fitting assemblies 602 in the illustrated system 600 can be generally similar to the fitting assemblies and associated components described above with reference to FIGS. 1A-5B. For example, the fitting assemblies 602 can include a male connector having retention features that rotatably engage corresponding engagement features of a female connector. According to another feature of the illustrated system 600, the conduits 604 can be generally straight or curved conduits. For example, the generally straight conduits 604 can include hard drawn tubes or pipes, and the curved conduits 604 can include annealed or soft tubes or pipes, or other flexible types of conduits. The conduits 604 of the illustrated embodiment can be configured to be suitable for conveying or transporting various types of fluids (e.g., liquids, gases, etc.), for covering electrical cables or lines, or for any other application where conduits are commonly used. Moreover, the conduits 604 can be made from metallic, plastic, or any other suitable material.

EXAMPLES

1. Apparatus for providing a connection, comprising:
a first part and a second part adapted to be threadably joined by relative rotation about a central longitudinal axis;
the first part comprising a male threaded section axially spaced from a ratchet section having radially protruding teeth, the male threaded section and the ratchet section centered about the central longitudinal axis;
the second part at least partly formed by an elastically deformable material, and comprising a female threaded section centered about the central longitudinal axis and axially spaced from at least one pawl adapted to fit between the radially protruding teeth;
the second part configured such that, when the second part is relaxed, the at least one pawl engages the ratchet section such that relative rotation between the first part and the second part is allowed in a tightening direction and prevented in a loosening direction; and
the second part further configured such that, when the second part is deformed by at least one radially inward force, the at least one pawl disengages the ratchet section.

2. The apparatus of example 1, wherein the second part further comprises an interior bore adapted to receive an end of a tube along the central longitudinal axis.

3. The apparatus of example 2, wherein the tube has a circumferential protrusion proximate to the end of the tube.

4. The apparatus of example 3, wherein the circumferential protrusion comprises a flange.

5. The apparatus of example 3, wherein the circumferential protrusion comprises a spring lock secured in an external annular groove in the tube.

6. The apparatus of example 3, wherein the interior bore has a first circumferential shoulder with a diameter approximately equal to a diameter of the circumferential protrusion, the first circumferential shoulder forming a retaining surface proximate to one end of the second part.

7. The apparatus of example 6, wherein the interior bore has a second circumferential shoulder axially spaced from the first circumferential shoulder and with a diameter greater that the diameter of the first circumferential shoulder, the second circumferential shoulder forming a stop surface.

8. The apparatus of example 7, further comprising a seal adaptor having a front end and a back end, the seal adaptor configured to engage the stop surface at the back end and engage an elastomeric seal at the front end.

9. The apparatus of example 1, wherein the second part further comprises at least one external marking indicative of a preferred location to apply the at least one radially inward force.

10. The apparatus of example 9, wherein the external marking comprises a textured region.

11. The apparatus of example 10, wherein the textured region locally increases pliability of the second part.

12. The apparatus of example 1, wherein the ratchet section comprises at least one clearance portion.

13. The apparatus of example 12, wherein the at least one clearance portion is configured to accommodate deformation of the second part.

14. The apparatus of claim 1, wherein at least one void adjacent to the second part is filled with a second deformable material that is more pliable than the elastically deformable material of the second part.

15. Apparatus for providing a connection comprising:
a first fitting and a second fitting adapted to be threadably coupled together by relative rotation about a central longitudinal axis;
the first fitting comprising a male threaded section axially spaced from a ratchet section having radially protruding teeth, the male threaded section and the ratchet section centered about the central longitudinal axis;
the second fitting comprising a female threaded section axially spaced from a pawl section adapted to mate with the radially protruding teeth, the female threaded section centered about the central longitudinal axis;
the second fitting at least partly formed by an elastically deformable material and configured such that, when the second part is relaxed, the pawl section engages the ratchet section such that the relative rotation between the first fitting and the second fitting is allowed in the tightening direction and prevented in the loosening direction; and the second fitting further configured such that, when the second part is deformed by at least one radially inward force, the pawl section disengages the ratchet section.

16. The apparatus of example 15, wherein the second fitting further comprises an interior bore adapted to receive an end of a tube along the central longitudinal axis.

17. The apparatus of example 16, wherein the second fitting is further configured to retain the tube within the interior bore.

18. The apparatus of example 15, wherein the second fitting further comprises a marking indicative of a preferred location to apply the at least one radially inward force.

19. The apparatus of example 15, wherein the ratchet section comprises at least one clearance region configured to accommodate deformation of the second fitting.

20. Apparatus for providing a connection comprising:
a first fitting having a connector end, the first fitting comprising a male threaded section proximate to the connector end and a ratchet section axially spaced from the male threaded section having radially protruding teeth, the male threaded section and the ratchet section centered about a central longitudinal axis;
a second fitting comprising a female threaded section centered about the central longitudinal axis and a flexible skirt extending axially from the female threaded section forming a connector opening, the flexible skirt comprising at least one pawl proximate to the connector opening, the at least one pawl being adapted to fit between the radially protruding teeth;
the first fitting and the second fitting adapted to be threadably coupled together by relative rotation about the central longitudinal axis upon insertion of the connector end into the connector opening;
the flexible skirt configured such that, when the flexible skirt is relaxed, the at least one pawl engages the ratchet section such that the relative rotation between the first fitting and the second fitting is allowed in the tightening direction and prevented in the loosening direction; and
the flexible skirt further configured such that, when the flexible skirt is deformed by at least one radially inward force, the at least one pawl disengages the ratchet section.

21. A method for providing a connection comprising:
inserting a first fitting into a second fitting, the first fitting comprising a male threaded section axially spaced from a ratchet section having radially protruding teeth, the male threaded section and the ratchet section centered about the central longitudinal axis, the second fitting comprising a female threaded section axially spaced from a pawl section adapted to mate with the radially protruding teeth, the female threaded section centered about the central longitudinal axis;
threadably coupling the first fitting and the second fitting by relative rotation therebetween in a tightening direction, the second fitting at least partly formed by an elastically deformable material and configured such that, when the second part is relaxed, the pawl section engages the ratchet section such that the relative rotation between the first fitting and the second fitting is allowed in the tightening direction and prevented in the loosening direction.

22. The method of example 21, wherein an end of a tube abuts the second fitting along the central longitudinal axis of the second fitting by an interior bore.

23. The method of example 22, wherein the tube is retained within the interior bore of the second fitting.

24. The method of example 21, further comprising applying at least one radially inward force such that the second part is deformed and the pawl section disengages the ratchet section.

25. The method of example 24, further comprising decoupling the first fitting and the second fitting by relative rotation therebetween in a loosening direction.

26. A system for providing a connection, comprising:
first means for joining two pipes;
second means for joining two pipes, the first and second means being threadably coupleable to one another;
means for allowing relative rotation between the first and second means in a tightening direction, and for preventing relative rotation in a loosening direction; and
means for disengaging the means for allowing relative rotation, the means for disengaging allowing the relative rotation in the loosening direction.

27. The system of example 26, further comprising means for forming a seal between the first and second means.

From the foregoing, it will be appreciated that specific embodiments of the disclosure have been described herein for purposes of illustration, but that various modifications may be made without deviating from the spirit or scope of the various embodiments of the disclosure. For example, embodiments of the present disclosure may provide a secure, vibration resistant electrical connection between two coaxial cables. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited except as by the appended claims.

The invention claimed is:

1. Apparatus for providing a connection, comprising:
a first part and a second part adapted to be threadably joined by relative rotation about a central longitudinal axis;
the first part comprising a male threaded section axially spaced from a ratchet section having radially protruding teeth, the male threaded section and the ratchet section centered about the central longitudinal axis;
the second part at least partly formed by an elastically deformable material, and comprising a female threaded section centered about the central longitudinal axis and axially spaced from at least one pawl adapted to fit between the radially protruding teeth;
the second part configured such that, when the second part is relaxed, the at least one pawl engages the ratchet section such that relative rotation between the first part and the second part is allowed in a tightening direction and prevented in a loosening direction;
the second part further configured such that, when the second part is deformed by at least one radially inward force, the at least one pawl disengages the ratchet section;
wherein the second part further comprises an interior bore adapted to receive an end of a tube along the central longitudinal axis, the tube having a circumferential protrusion proximate to the end of the tube;
wherein the interior bore has a first circumferential shoulder with a diameter approximately equal to a diameter of the circumferential protrusion, the first circumferential shoulder forming a retaining surface proximate to one end of the second part; and wherein the interior bore has a second circumferential shoulder axially spaced from the first circumferential shoulder and with a diameter greater than the diameter of the first circumferential shoulder, the second circumferential shoulder forming a stop surface.

2. The apparatus of claim 1, wherein the circumferential protrusion comprises a flange.

3. The apparatus of claim 1, wherein the circumferential protrusion comprises a spring lock secured in an external annular groove in the tube.

4. The apparatus of claim 1, further comprising a seal adaptor having a front end and a back end, the seal adaptor configured to engage the stop surface at the back end and engage an elastomeric seal at the front end.

5. The apparatus of claim 1, wherein the second part further comprises at least one external marking indicative of a preferred location to apply the at least one radially inward force.

6. The apparatus of claim 5, wherein the external marking comprises a textured region.

7. The apparatus of claim 6, wherein the textured region locally increases pliability of the second part.

8. The apparatus of claim 1, wherein the ratchet section comprises at least one clearance portion.

9. The apparatus of claim 8, wherein the at least one clearance portion is configured to accommodate deformation of the second part.

10. The apparatus of claim 1, wherein at least one void adjacent to the second part is filled with a second deformable material that is more pliable than the elastically deformable material of the second part.

11. Apparatus for providing a connection comprising:
a first fitting and a second fitting adapted to be threadably coupled together by relative rotation about a central longitudinal axis;
the first fitting comprising a male threaded section axially spaced from a ratchet section having radially protruding teeth, the male threaded section and the ratchet section centered about the central longitudinal axis;
the second fitting comprising a female threaded section axially spaced from a pawl section adapted to mate with the radially protruding teeth, the female threaded section centered about the central longitudinal axis;
the second fitting at least partly formed by an elastically deformable material and configured such that, when the second part is relaxed, the pawl section engages the ratchet section such that the relative rotation between the first fitting and the second fitting is allowed in the tightening direction and prevented in the loosening direction;
the second fitting further configured such that, when the second part is deformed by at least one radially inward force, the pawl section disengages the ratchet section; and
wherein the ratchet section comprises at least one generally planar clearance section configured to accommodate radially inward deformation of the second fitting.

12. The apparatus of claim 11, wherein the second fitting further comprises an interior bore adapted to receive an end of a tube along the central longitudinal axis.

13. The apparatus of claim 12, wherein the second fitting is further configured to retain the tube within the interior bore.

14. The apparatus of claim 11, wherein the second fitting further comprises a marking indicative of a preferred location to apply the at least one radially inward force.

15. Apparatus for providing a connection comprising:
a first fitting having a connector end, the first fitting comprising a male threaded section proximate to the connector end and a ratchet section axially spaced from the male threaded section having radially protruding teeth, the male threaded section and the ratchet section centered about a central longitudinal axis;
a second fitting comprising a female threaded section centered about the central longitudinal axis and a flexible skirt extending axially from the female threaded section forming a connector opening, the flexible skirt comprising at least one pawl proximate to the connector opening, the at least one pawl being adapted to fit between the radially protruding teeth;
the first fitting and the second fitting adapted to be threadably coupled together by relative rotation about the central longitudinal axis upon insertion of the connector end into the connector opening;
the flexible skirt configured such that, when the flexible skirt is relaxed, the at least one pawl engages the ratchet section such that the relative rotation between the first fitting and the second fitting is allowed in the tightening direction and prevented in the loosening direction;
the flexible skirt further configured such that, when the flexible skirt is deformed by at least one radially inward force, the at least one pawl disengages the ratchet section; and
wherein at least one void adjacent to the second fitting is filled with a deformable material that is more pliable than the deformable flexible skirt.

16. A method for providing a connection comprising:
inserting a first fitting into a second fitting, the first fitting comprising a male threaded section axially spaced from a ratchet section having radially protruding teeth, the male threaded section and the ratchet section centered about the central longitudinal axis, the second fitting comprising a female threaded section axially spaced from a pawl section adapted to mate with the radially protruding teeth, the female threaded section centered about the central longitudinal axis;
threadably coupling the first fitting and the second fitting by relative rotation therebetween in a tightening direction, the second fitting at least partly formed by an elastically deformable material and configured such that, when the second part is relaxed, the pawl section engages the ratchet section such that the relative rotation between the first fitting and the second fitting is allowed in the tightening direction and prevented in the loosening direction and such that, when a radially inward force is applied at a textured region on the second fitting, the pawl section is deflected radially outward out of engagement with the ratchet section such that the relative rotation between the first fitting and the second fitting is allowed in both the tightening and the loosening direction.

17. The method of claim 16, wherein an end of a tube abuts the second fitting along the central longitudinal axis of the second fitting by an interior bore.

18. The method of claim 17, wherein the tube is retained within the interior bore of the second fitting.

19. The method of claim 16, further comprising applying at least one radially inward force such that the second part is deformed and the pawl section disengages the ratchet section.

20. The method of claim 19, further comprising decoupling the first fitting and the second fitting by relative rotation therebetween in a loosening direction.

* * * * *